Nov. 20, 1928.

R. SANCHEZ

MORTISING MACHINE

Filed Aug. 23, 1927

1,692,580

INVENTOR
Reynaldo Sanchez
BY
ATTORNEY

Patented Nov. 20, 1928.

1,692,580

UNITED STATES PATENT OFFICE.

REYNALDO SÁNCHEZ, OF MONTEREY, MEXICO.

MORTISING MACHINE.

Application filed August 23, 1927. Serial No. 214,904.

This invention relates to improvements in chiseling machines adapted for use in the manufacture of wooden furniture and the like, especially in cases where the production is limited which does not permit of expensive labor saving single purpose machines.

The object of the invention is to provide a chiseling machine of novel construction and arrangement of parts, hereinafter more fully described, claimed and illustrated in the accompanying drawing in which:

Figure 1:
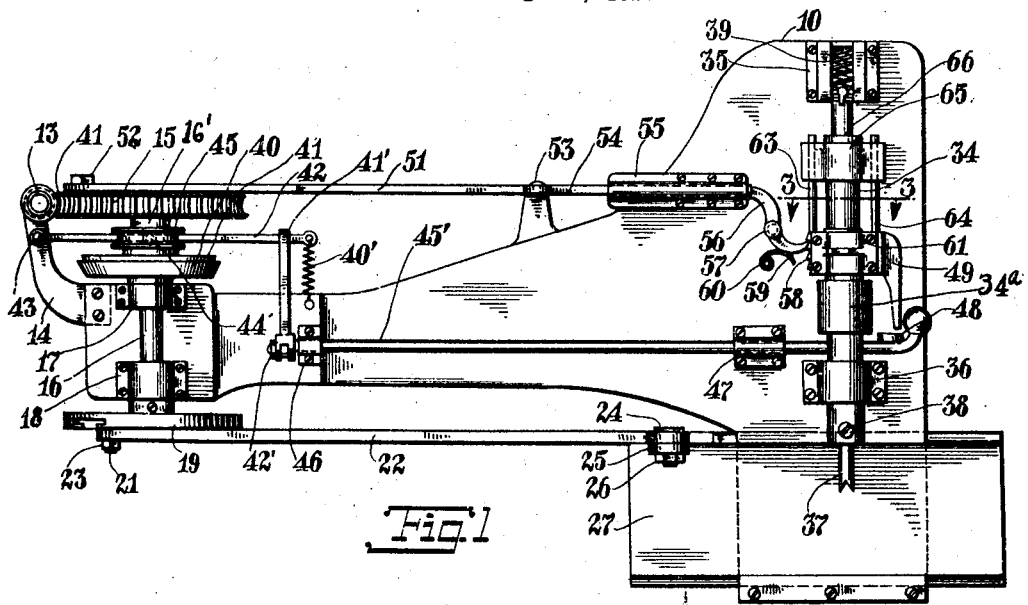
Fig. 1 shows a top plan view of my improved chiseling machine.
Figure 2:
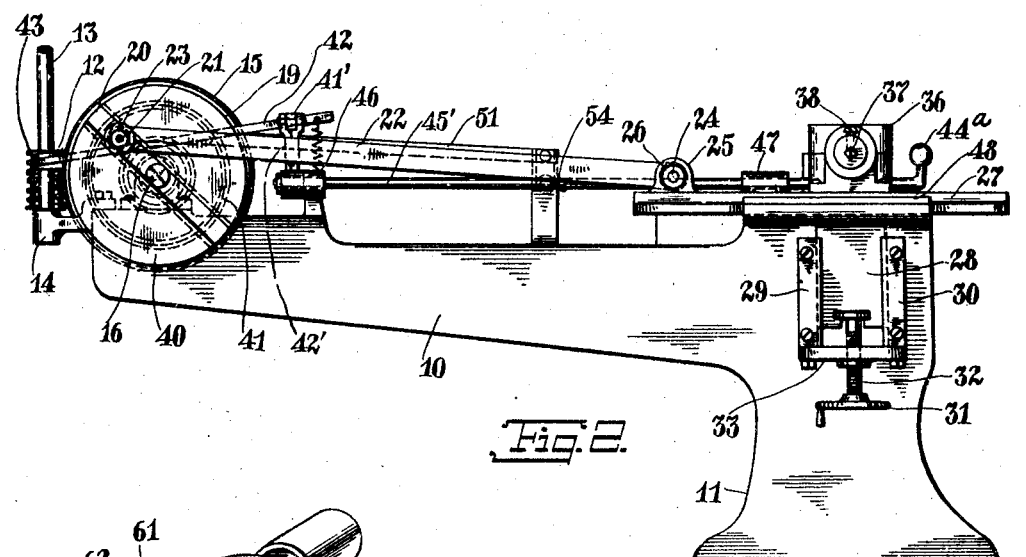
Fig. 2 shows a front elevational view thereof.
Figure 3:
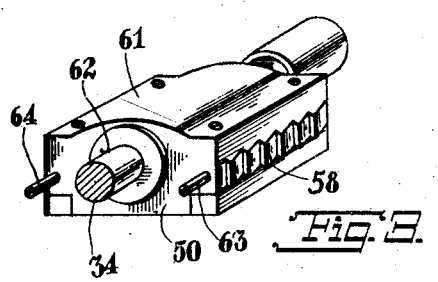
Fig. 3 shows an enlarged detail perspective view of the release member as embodied in my improved machine.

As here embodied my improved chiseling machine comprises a table 10, or stand, provided with a base element 11. The worm 12 is attached to the shaft 13 rotatively mounted in the bracket 14 attached to the table 10. The shaft 13 is further rotatively mounted in a bracket, not shown in the accompanying drawing, as a means of rotatively supporting the said shaft 13 which has attached thereto, a pulley, gear or the like, or which may be directly attached to an electric motor, as a means of rotating the shaft 13 so as to drive my improved machine.

The worm wheel 15 meshes with the worm 12, and is attached to the tubular member 16', mounted on the shaft 16 rotatively mounted in the brackets 17 and 18 attached to the stand 10. The disc member 19 is attached to one extremity of the shaft 16, and has formed or cut therein a transverse groove 20 provided with an enlarged inner portion to receive the enlarged head of the pin 21. The rod 22 is pivotally attached at one extremity to the pin 21. The rod 22 is secured to the pin 21 which is also secured in the transverse groove 20 by the nut 23 threadedly attached to the pin 21. The above described construction is such as will permit the rod 22 to be attached to the disc member 19 so as to increase or decrease the stroke of the rod 22. The rod 22 is pivotally attached, at its extended extremity, as at 24, by a pin, secured to the lug element 25 of the work table 27, by the nut 26 threadedly attached to the pin 24. The work table 27 is slidably mounted in the supporting member 28. The supporting member 28 is slidably mounted in the guide members 29 and 30 attached to the table 10. The hand wheel 31 is attached to the threaded member 32 threadedly attached to the cross support 33 attached to the guide members 29 and 30.

The clutch member 40 is attached to the above mentioned shaft 16, and is provided with a tapered rim adapted to receive the tapered periphery of the clutch engaging member 41. The clutch engaging member 41 is slidably mounted on the tubular member 16', and is provided with a serrated axial aperture adapted to engage similar serrations formed in the tubular member 16'. The latter described construction is such as will permit the tubular member 16' to rotate the clutch engaging member 41. The arm 42 is pivotally attached, as at 43, to the bracket 14, and has attached intermediate thereto a roller 44 adapted to engage in a coaxial groove 45 formed in the clutch engaging member 41. The tension spring 40' is attached to the free extremity of the arm 42, and to the table 10 so as to normally hold the clutch engaging member 41 in contact with the clutch member 40. The above described construction is such as will permit the rod 22 to oscillate the work table 27, and which will permit the hand wheel 31 to raise or lower the work table 27.

The rod 41' is attached to the free extremity of the arm 42, and to the extended extremity of the lever 42' attached to the shaft 45'. The shaft 45' is rotatively mounted in the brackets 46 and 47 attached to the table 10. The shaft 45' is provided with a downwardly extended portion 48 adapted to be engaged by the finger 49 attached to the release member 50 secured to the rod 34. The above described construction is such as will permit the finger 49, when the cutting tool has completed a working stroke or assumed an extended position to engage the extended portion 48 of the shaft 45', so as to disengage the clutch engaging member 41 with the clutch member 40, as a means of stopping the oscillating of the work table 27. The shaft 45' has an enlarged end 44ª for manual moving of the shaft for accomplishing the same purpose whenever desired.

The rod 34 is slidably mounted in the brackets 35 and 36 attached to the table 10, and is provided with an axial aperture adapted to receive the cutting tool 37 provided with a cutting edge at its extremity. The cutting tool 37 is securely held in the aperture formed in the rod 34 by the set screw 38 threadedly attached to the rod 34. The cutting tool 37 is urged forward so as to engage and cut the work which is placed on the work table 27 by the expansion spring 39 positioned in the bracket 35 at the rear of the rod 34.

The eccentric rod 51 is attached, at one extremity, as at 52 by a bolt, screw, or the like, at or near the periphery of the worm wheel 15. The eccentric rod 51 is pivotally attached, as at 53, by a pin, or the like, to the rod 54 slidably mounted in the bracket 55 attached to the table 10. The bell crank 56 is pivotally attached as at 57, by a pin, or the like, to the table 10, and is held in engagement with the free extremity of the rod 54, and in engagement with the teeth 58 formed or cut in the release member 50 by the curved spring 59 attached at one extremity as at 60 by a pin, or the like, to the table 10. The above described construction is such as will permit the bell crank 56 to disengage the teeth 58 when the shaft 16 is rotated, as a means of allowing the compression spring 39 to function, as hereinbefore described and set forth.

The release member 50 is provided with an aperture adapted to receive the rod 34, and has attached thereto a cap 61. The release member 50 is fixed to the rod 34 by the collar attached to the said spindle. The release member 50 is further supported by the rods 63 and 64 attached thereto, and to the supporting member 65 secured to the rod 34 by the collar 66 attached thereto In operation of the device, the shaft 13 turns, causing the worms to turn and the tubular member 16'. The turning of worm wheel 15 operates the rod 51 for releasing the member 50 so that the rod 34 is urged forward by the spring 39 to a position as determined by a collar 34ª fixed on the rod and striking the bracket 36. Normally, rotation of the tubular member 16' is transmitted to shaft 16 bar oscillating the table 27, but when the rod 34 moves forward, finger 49 strikes portion 48 for disengaging the clutch 40, 41 and stopping the table 27 from reciprocating. Then the rod 34 must be manually moved to retracted position, and immediately the table 27 reciprocates, the crank 56 engages the teeth 58 and the device is in original position.

It is obvious that I have provided a means of chiseling a piece of wood, such as used in the manufacture of furniture and the like.

Having thus described my invention, what I claim as new and desire to protect by Letters Patent of the United States is as follows:

In a chiseling machine, a rod slidably mounted and adapted for holding a cutting tool, a means for urging the rod forward for operating the cutting tool, a release member attached to the rod and formed with teeth on one side, a bell crank pivotally mounted and arranged for normally engaging the said teeth for restraining forward motion of the rod, a second rod engaging against the said bell crank, a third rod hinged to the second rod, and eccentrically connected with a driver wheel for motion to move the bell crank and release the cutting tool.

In testimony whereof I have affixed my signature.

REYNALDO SÁNCHEZ.